US007764487B2

(12) United States Patent
Huang et al.

(10) Patent No.: US 7,764,487 B2
(45) Date of Patent: Jul. 27, 2010

(54) DISPLAY WITH A CLOSED LIQUID-FLOWING DEVICE

(75) Inventors: Wen-Hung Huang, Tucheng (TW); Chien-Kun Hsu, Yonghe (TW)

(73) Assignee: Hannspree, Inc., Taipei (TW)

( * ) Notice: Subject to any disclaimer, the term of this patent is extended or adjusted under 35 U.S.C. 154(b) by 141 days.

(21) Appl. No.: 12/251,474

(22) Filed: Oct. 15, 2008

(65) Prior Publication Data

US 2010/0091435 A1 Apr. 15, 2010

(51) Int. Cl.
*G06F 1/16* (2006.01)

(52) U.S. Cl. .................. 361/679.01; 361/688; 348/335; 349/161; 701/114; 525/236

(58) Field of Classification Search ................. 361/688, 361/695, 679.01, 679.05, 679.06, 679.21, 361/679.26, 679.27, 679.29; 348/789, 335, 348/333.07; 349/64, 117, 106, 96, 161, 158; 701/21, 53, 70, 114; 345/87, 102, 107, 98; 525/326.6, 208, 333.7, 191, 236, 242
See application file for complete search history.

(56) References Cited

U.S. PATENT DOCUMENTS

2006/0164804 A1 * 7/2006 Kim et al. .................. 361/688
2009/0051829 A1 * 2/2009 Nagahata et al. ............ 348/789

* cited by examiner

*Primary Examiner*—Hung V Duong
(74) *Attorney, Agent, or Firm*—Pearne & Gordon LLP

(57) ABSTRACT

A display has a closed body, a display panel, an inactive propeller, an inactive magnet and a driving assembly. The closed body has an inner cavity and liquid. The display panel is mounted around by the closed body. The inactive propeller is mounted rotatably in the inner cavity and has multiple blades to agitate the liquid. The inactive magnet is mounted securely in the inactive propeller. The driving assembly is mounted on the closed body outside the inner cavity and has a power unit, a shaft and an active magnet. The active magnet is attached to the shaft and corresponds to the inactive magnet. With the magnetic force between the active and inactive magnets, the power is transmitted into the closed body without any physical contact. Therefore, the closed body does not require any waterproof structures and the liquid maintains clean and isolated from the outer environment.

18 Claims, 5 Drawing Sheets

DISPLAY WITH A CLOSED LIQUID-FLOWING DEVICE

BACKGROUND OF THE INVENTION

1. Field of the Invention

The present invention relates to a display, especially to a display with a closed liquid-flowing device being mounted around the display panel.

2. Description of the Prior Arts

As the raise of the income in the modern society, people not only earn money to live, but also the needs for entertainment. The needs to have decorative products are also increased. One of the decorations is a conventional decorative tube. The conventional decorative tube has a tubular body and a pump. The tubular body is filled with liquid. The pump is mounted under the tubular body to pump the liquid and is connected to a power source outside the tubular body. The liquid flows in the tubular body via the pump to perform decorative appearance. However, the conventional decorative tube has numerous disadvantages as following:

1. The tubular body has an opening to allow the pump to be mounted on. To keep the liquid inside the tubular body without leaking out from the opening, the tubular body has a corresponding waterproof structure formed around the opening. Therefore, the manufacturing cost is increased to have the corresponding waterproof structure.

2. Because of the opening of the tubular body, the small objects such as dust and bugs easily get into the tubular body through the opening. The small objects can pollute the liquid inside the tubular body. The polluted liquid can effects the appearance of the conventional decorative tube and may propagate bacteria and vermin.

To overcome the shortcomings, the present invention provides a display with a closed liquid-flowing device to mitigate or obviate the aforementioned problems.

SUMMARY OF THE INVENTION

The main objective of the present invention is to provide a display with a closed liquid-flowing device. The display has a sealed body, a display panel, an inactive propeller, an inactive magnet and a driving assembly. The closed body has an inner cavity and liquid. The display panel is mounted around by the closed body. The inactive propeller is mounted rotatably in the inner cavity and has multiple blades to agitate the liquid. The inactive magnet is mounted securely in the inactive propeller. The driving assembly is mounted on the closed body outside the inner cavity and has a power unit, a shaft and an active magnet. The shaft is connected to and is driven by the power unit. The active magnet is attached to the shaft and corresponds to the inactive magnet. With the magnetic force between the active and inactive magnets, the power is transmitted into the closed body without any physical contact. Therefore, the closed body does not require any waterproof structures and the liquid is maintained clean and isolated from the outer environment.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
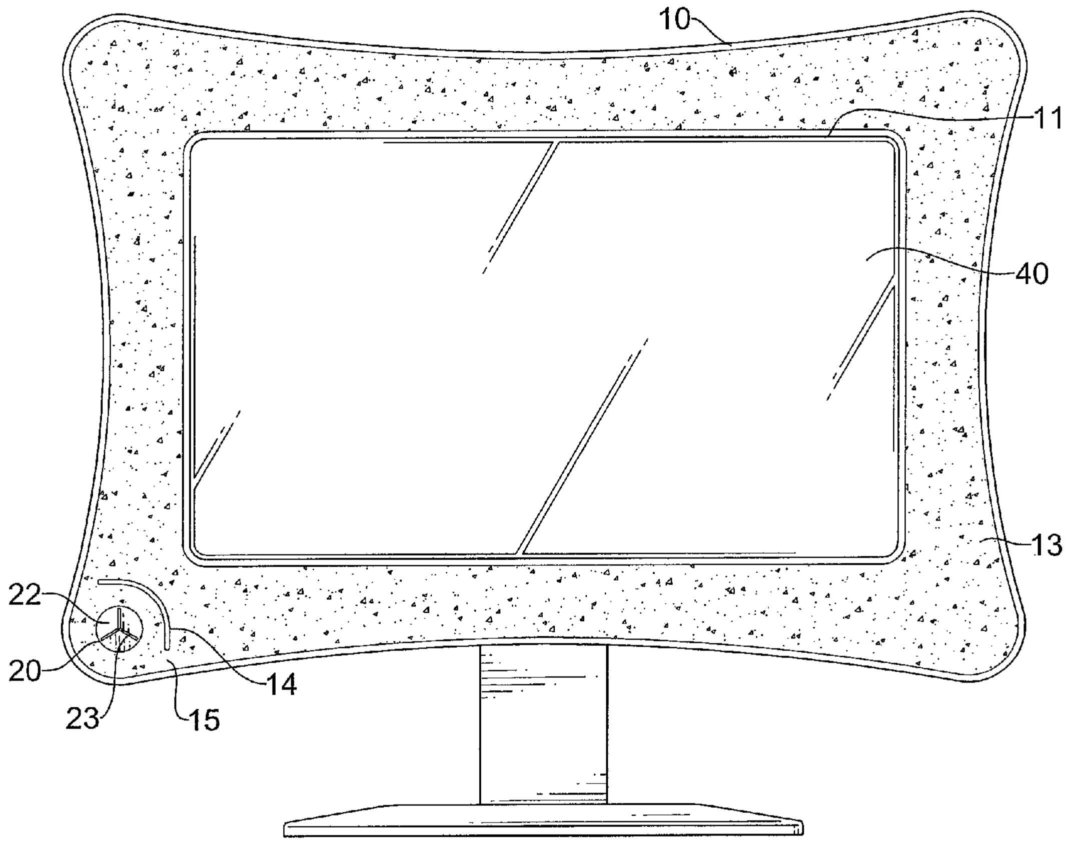
FIG. 1 is front view of a display with a closed liquid-flowing device in accordance with the present invention.
Figure 2:
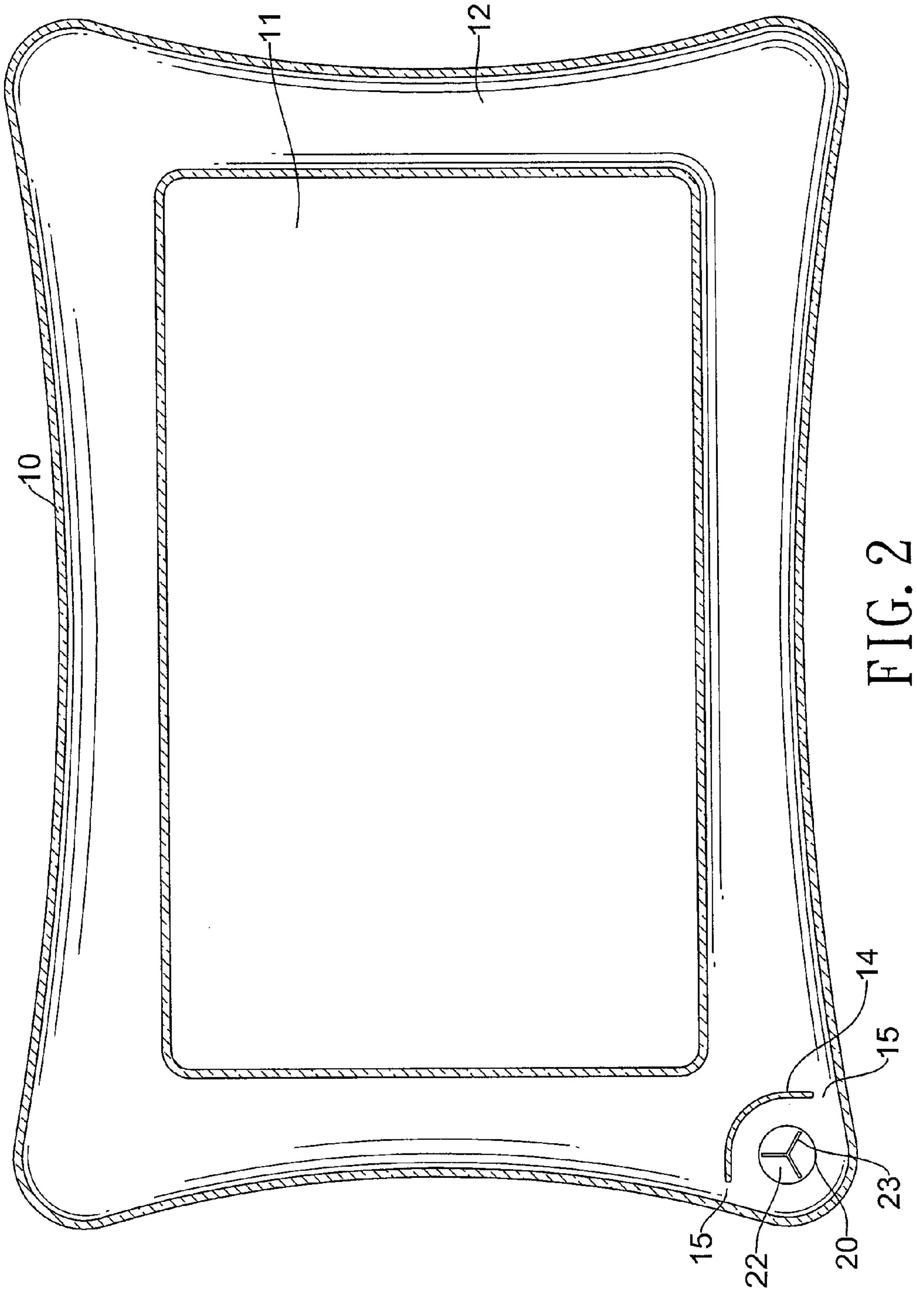
FIG. 2 is a cross-sectional front view of a closed body of the display in FIG. 1.
Figure 3:
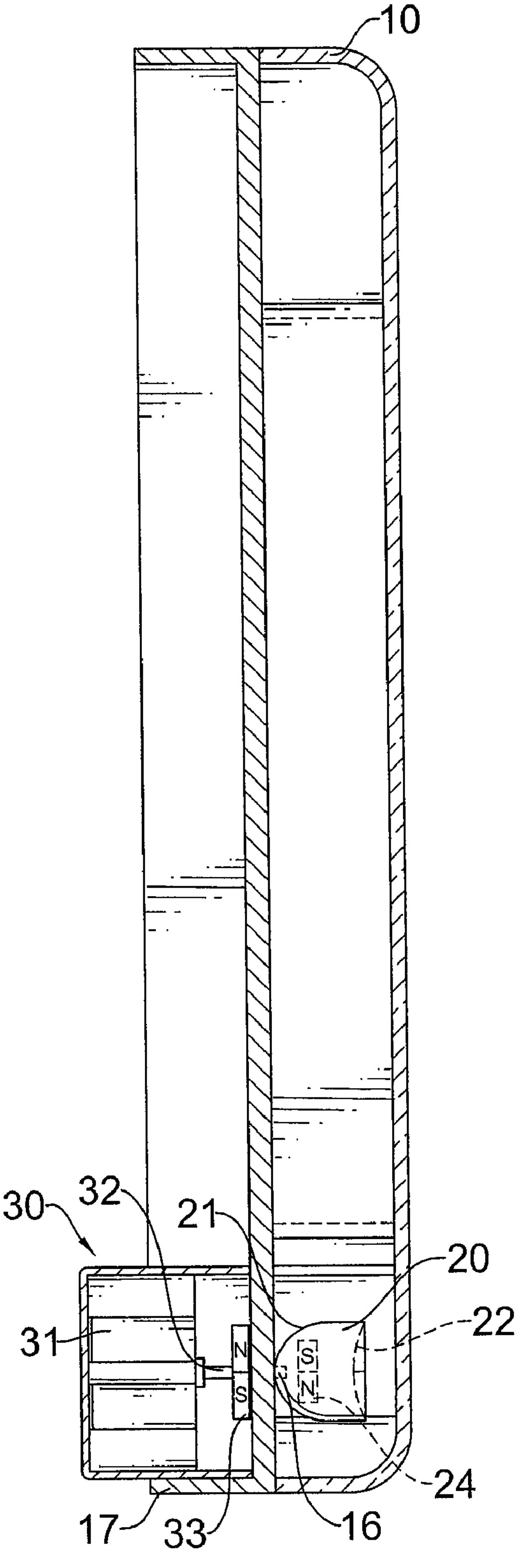
FIG. 3 is a side view in partial section of the closed body in FIG. 2.

With reference to FIGS. 1 to 3, a display with a closed liquid-flowing device in accordance with the present invention comprises a closed body (10), a display panel (40), an inactive propeller (20), an inactive magnet (24) and a driving assembly (30).

The closed body (10) is tubular shape, hollow and has a rear wall, an inner cavity (12), liquid, decorative particles (13), a guiding partition (14), two channels (15), a protrusion (16) and a mounting bracket (17). The closed body (10) encloses an opening (11) and may have multiple corners. The inner cavity (12) has an outer sidewall. The liquid is filled in the inner cavity (12) and is not limited to but may be water, oil (such as mineral oil), or the mixture and the like. The decorative particles (13) are filled inside the inner cavity (12) and may be paillette, scraps of paper, toys, or the like. The guiding partition (14) is curved, is formed in the inner cavity (12) adjacent to one of the corners of the closed body (10) and has two ends. The channels (15) are formed respectively between the ends of the guiding partition (14) and the outer sidewall of the inner cavity (12). The protrusion (16) is formed on the rear wall of the closed body (10) and protrudes into the inner cavity (12). The mounting bracket (17) is formed on and protrudes out from the rear wall of the closed body (10).

With reference to FIG. 1, the display panel (40) is mounted securely in the opening (11) of the closed body (10) and is mounted around by the closed body (10). The display panel (40) may be a digital photo frame (DPF), a liquid crystal display (LCD), a plasma display panel (PDP), or the like.

Figure 4:
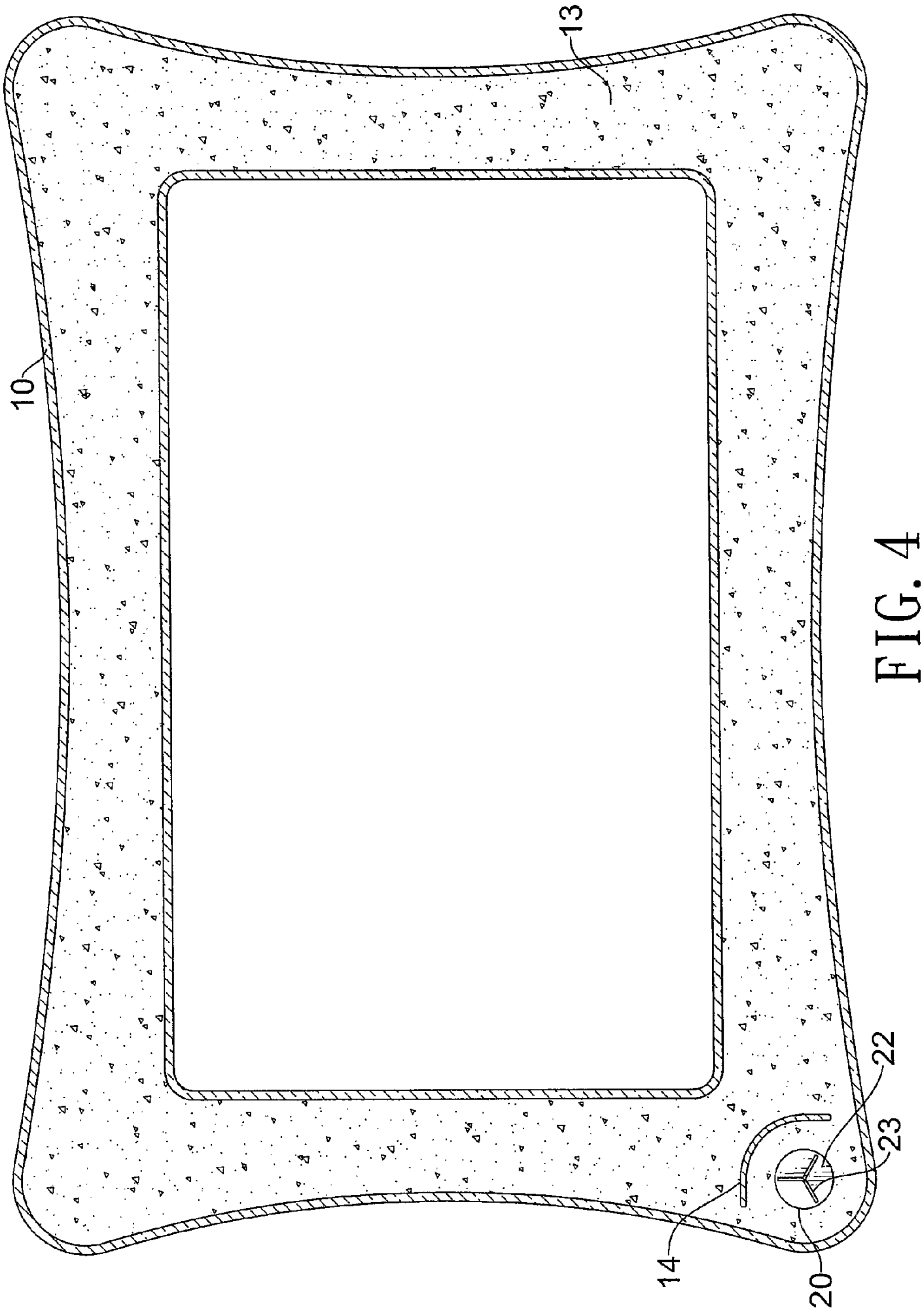
FIG. 4 is an operational cross-sectional front view of the closed body in FIG. 2.
Figure 5:
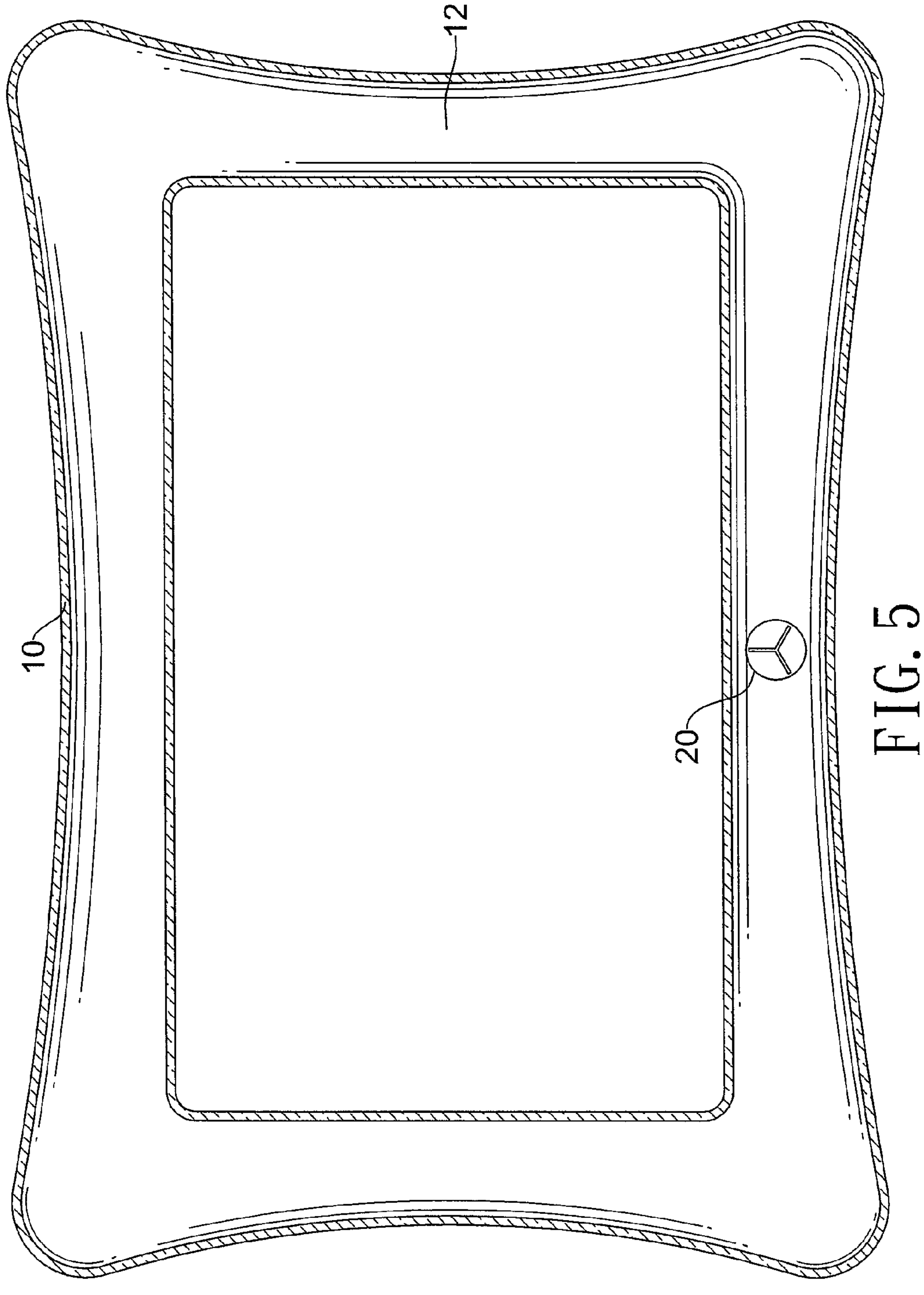
FIG. 5 is a cross-sectional front view of another embodiment of a closed body of a display with a closed liquid-flowing device in accordance with the present invention.

With reference to FIGS. 3 to 5, the inactive propeller (20) is mounted rotatably in the inner cavity (12) of the closed body (10) and has a rotating axis, a rear surface (21), a front surface (22) and at least one blade (23). The inactive propeller (20) may be mounted at any desired position in the inner cavity (12) of the closed body (10), but preferably mounted between the guiding partition (14) and the corresponding corner of the closed body (10). The rear surface (21) of the inactive propeller (20) is mounted rotatably around the protrusion (16) of the closed body (10) and may be top-shaped to reduce flowing resistance. The front surface (22) may have a spherical recess to reduce flowing resistance. The blades (23) are attached securely to the front surface (22).

The inactive magnet (24) is mounted securely in the inactive propeller (20) and has two magnetic poles both facing to the rear surface of the inactive propeller (20).

The driving assembly (30) is mounted securely on the closed body (10) outside of the inner cavity (12), corresponds to the inactive propeller (20), may be mounted securely on the mounting bracket (17) and has a power unit (31), a shaft (32) and an active magnet (33). The power unit (31) is mounted securely on the closed body (10) outside of the inner cavity (12) and may be mounted securely on the mounting bracket (17). The shaft (32) is connected to and is driven by the power unit (31), aligns with the rotating axis of the inactive propeller (20) and has a distal end. The active magnet (33) is attached securely to the distal end of the shaft (32), corresponds to the inactive magnet (24) and has two magnet poles both facing to the rear surface (21) of the inactive propeller (20).

With further reference to FIGS. 3 and 4, the power unit (31) is used to rotate the shaft (32). The active magnet (33) is rotated to drive the inactive magnet (24). Because the inactive magnet (24) is mounted securely in the inactive propeller (20), the inactive propeller (20) is rotated with the inactive magnet (24). Then the blades (23) are rotated to agitate the liquid in the inner cavity (12). Therefore, the liquid in the inner cavity (12) flows in circulation to bring the decorative particles (13) to move. The flowing liquid and the moving particles (13) create decorative effect.

With further reference to FIG. 2, the inactive propeller (20) is mounted between the guiding partition (14) and the corresponding corner of the body (10). The liquid is restricted to flow through the channels (15). Therefore, the flowing liquid and the moving particles (13) are gathered to perform a unique visual effect.

The monitor as described has numerous advantages. With the magnetic force between the active and inactive magnets (33, 24), the power is transmitted into the closed body (10) without any physical contacts so the closed body (10) does not need any opening. Therefore, the display as described does not have to add any waterproof structures so the manufacturing cost is reduced. Furthermore, the liquid in the inner cavity (12) of the closed body (10) has no chance to be polluted by the outer environment. Thus, the appearance of the liquid is maintained clean.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A display comprising:
a closed body being tubular shape and hollow and having
a rear wall;
an inner cavity having an outer sidewall;
liquid being filled in the inner cavity; and
decorative particles being filled in the inner cavity;
an opening being enclosed by the closed body;
a display panel being mounted in the opening and is mounted around by the closed body;
an inactive propeller being mounted rotatably in the inner cavity of the closed body and having
a rotating axis;
a rear surface;
a front surface; and
at least one blade being attached securely to the front surface of the propeller;
an inactive magnet being mounted securely in the inactive propeller and having two magnetic poles; and
a driving assembly being mounted securely on the closed body outside of the inner cavity, corresponding to the inactive propeller and having
a power unit being mounted securely on the closed body outside of the inner cavity;
a shaft being connected to and being driven by the power unit and having a distal end; and
an active magnet being attached securely to the distal end of the shaft, corresponding to the inactive magnet and having two magnet poles.

2. The display as claimed in claim 1, wherein the shaft of the driving assembly aligns with the rotating axis of the inactive propeller.

3. The display as claimed in claim 2, wherein
the magnetic poles of the inactive magnet both face to the rear surface of the inactive propeller; and
the magnet poles of the active magnet both face to the rear surface of the inactive propeller.

4. The display as claimed in claim 3, wherein
the closed body has multiple corners; and
the inactive propeller is mounted adjacent to one of the corners of the closed body.

5. The display as claimed in claim 4, wherein
the closed body has
a guiding partition being curved, being formed in the inner cavity adjacent to the inactive propeller and having two ends; and
two channels being formed respectively between the ends of the guiding partition and the outer sidewall of the inner cavity; and
the inactive propeller is mounted between the guiding partition and the corresponding corner of the closed body.

6. The display as claimed in claim 5, wherein the rear surface of the inactive propeller is top-shaped.

7. The display as claimed in claim 6, wherein the front surface of the inactive propeller has a spherical recess.

8. The display as claimed in claim 7, wherein
the closed body has a protrusion being formed on the rear wall of the closed body and protruding into the inner cavity; and
the rear surface of the inactive propeller is mounted rotatably around the protrusion of the closed body.

9. The display as claimed in claim 8, wherein
the closed body has a mounting bracket being formed on and protruding out from the rear wall of the closed body; and
the power unit is mounted securely on the mounting bracket.

10. The display as claimed in claim 1, wherein
the magnetic poles of the inactive magnet both face to the rear surface of the inactive propeller; and
the magnet poles of the active magnet both face to the rear surface of the inactive propeller.

11. The display as claimed in claim 1, wherein
the closed body has multiple corners; and
the inactive propeller is mounted adjacent to one of the corners of the closed body.

12. The display as claimed in claim 11, wherein
the closed body has
a guiding partition being curved, being formed in the inner cavity adjacent to the inactive propeller and having two ends; and
two channels being formed respectively between the ends of the guiding partition and the outer sidewall of the inner cavity; and
the inactive propeller is mounted between the guiding partition and the corresponding corner of the closed body.

13. The display as claimed in claim 1, wherein the rear surface of the inactive propeller is top-shaped.

14. The display as claimed in claim 1, wherein the front surface of the inactive propeller has a spherical recess.

15. The display as claimed in claim 1, wherein
the closed body has a protrusion being formed on the rear wall of the closed body and protruding into the inner cavity; and
the rear surface of the inactive propeller is mounted rotatably around the protrusion of the closed body.

16. The display as claimed in claim 1, wherein the closed body has a mounting bracket being formed on and protruding out from the rear wall of the closed body; and the power unit is mounted securely on the mounting bracket.

17. The display as claimed in claim 1, wherein the display panel is a digital photo frame or a liquid crystal display or a plasma display panel.

18. The display as claimed in claim 1, wherein the decorative particles are paillette or scraps of paper or toys.

* * * * *